United States Patent
Mitkin et al.

(12)

(10) Patent No.: US 6,403,261 B2
(45) Date of Patent: *Jun. 11, 2002

(54) CARBON-CONTAINING MATERIAL AND A METHOD OF MAKING POROUS ELECTRODES FOR CHEMICAL SOURCES OF ELECTRIC CURRENT

(76) Inventors: Valentin Nikolaevich Mitkin, Polevaya,d.11,kv.87, 630128, Novosibirsk,ul.; Nikolai Fedorovich Judanov, Arbuzova, d.1, kv.41, 630117, Novosibirsk,ul.; Alexandr Anatolievich Galitsky, Akademicheskaya, d.2a kv. 514, 630090, Novosibirsk, ul.; Alexandr Borisovich Alexandrov, Kurchatova, d.7/5, kv. 50, 630129, Novosibirsk, ul.; Vladimir Leonidovich Afanasiev, Rassvetnaya, d.2/3, kv.63, 630129, Novosibirsk, ul.; Viktor Vasilievich Mukhin, Rassvetnaya, d.2/1, kv.63, Novosibirsk, ul.; Vladimir Vladimirovich Rozhkov, Cheljuskintsev, d.15/1, kv.36, 630132, Novosibirsk, ul.; Vasily Petrovich Romashkin, Tjulenina, d.1/2, kv. 6, 630129, Novosibirsk, ul.; Vladlen Vladimirovich Telezhkin, Tankovaya, d.27, kv. 46, 630075, Novosibirsk, ul., all of (RU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,617

(22) PCT Filed: Jul. 31, 1996

(86) PCT No.: PCT/RU96/00206

§ 371 (c)(1),
(2), (4) Date: Apr. 28, 1999

(87) PCT Pub. No.: WO98/05082

PCT Pub. Date: Feb. 5, 1998

(51) Int. Cl.[7] ................................................ H01M 4/58

(52) U.S. Cl. ................................ 429/231.8; 429/231.8; 429/224; 429/220; 423/415.1; 423/448

(58) Field of Search .............................. 429/231.8, 224, 429/220; 423/415.1, 448

(56) References Cited

U.S. PATENT DOCUMENTS

| 4,608,324 A |   | 8/1986 | Fujii et al. ................... 429/194 |
| 4,687,716 A | * | 8/1987 | Nagaura ...................... 429/145 |
| 4,971,868 A |   | 11/1990 | Tucholski et al. .......... 429/174 |

FOREIGN PATENT DOCUMENTS

| DE | A1 2946174 |   | 6/1980 |
| EP | A1 0162923 |   | 12/1985 |
| FR | A1 2464566 |   | 3/1981 |
| GB | A 2030352 |   | 4/1980 |
| JP | 60-148056 | * | 8/1985 |
| WO | WO A1 85/02297 |   | 5/1985 |

OTHER PUBLICATIONS

Hamwi et al. "Graphite oxyfluoride: behavior as electrode material in lithium batteries", J. Power Sources, 48 (3), 311–325, 1994.*
International Search Report (PCT/RU96/00206).

* cited by examiner

*Primary Examiner*—Laura Weiner
(74) *Attorney, Agent, or Firm*—J. Herbert O'Toole; Nexsen Pruet Jacobs & Pollard, LLC

(57) ABSTRACT

The proposed carbon-containing material comprises an electrode-active material, preferably a fluorocarbon, containing 58–67 wt. % fluorine, a binder, an agent adding to the conductance of the electrode-active material, and an expanding agent, in the capacity of which graphite fluoroxide is used is used. The proposed method of making a porous electrode comprises the following steps: a step-by-step mixing of the abovesaid components, at the first of which graphite fluoroxide is mixed together with the electrode-active material, the resultant mixture is modified, predominantly by subjecting it to impact action to prepare an intermediate product which at the second step is mixed together with the binder and the agent adding to the conductance of the electrode-active material, followed by forming an electrode and its heat-treatment to establish pores in its structure without destruction thereof.

27 Claims, No Drawings

US 6,403,261 B2

CARBON-CONTAINING MATERIAL AND A METHOD OF MAKING POROUS ELECTRODES FOR CHEMICAL SOURCES OF ELECTRIC CURRENT

TECHNICAL FIELD

The present invention relates in general to electrochemical cells and more specifically to a carbon-containing material for electrodes of electrochemical cells and to a method of making porous electrodes from said material.

The herein-proposed invention can find application in establishing novel carbon-containing energy-saturated electrode materials made use of in electrochemical cells, largely in 1.5- and 3-volt lithium cells.

BACKGROUND ART

There exists at present a problem in electrochemical cells using solid-state electrodes how to provide high energy-capacity of electrodes and simultaneously high operating density of discharge current. The problem concerns predominantly cathodes because anodes of electrochemical cells based on active metals, ie., lithium, sodium, zinc, and others are most frequently used in constructions of electrochemical cells in their compact state, that is, with their density which is realized to a maximum extent in anodes and is equal to or approximates their pycnometric density realizable in crystal lattices of said materials.

To realize maximum characteristics of electrochemical cells as to energy capacity thereof, it is necessary to use electrode-active materials having high specific weight and volume characteristics with a maximum possible filling of the electrode construction with an electrode-active material. However, a higher electrode density due to a more complete filling of the electrode volume with an electrode-active material reduces the electrode surface available for a current-generating reaction to proceed, whereby the effective density of the electrode discharge current as a whole is adversely affected.

On the other hand, the effective density of the electrode discharge current can be increased due to a larger effective electrode surface attainable by a finer dividing of the electrode components and adding to its composition such materials that enhance the electrode conductance. This in turn results in higher electrode porosity but also leads to a lower content of the principal electrode component, that is, an electrode-active material.

Therefore resolving the problem of creating a high energy-capacity electrochemical cell featuring a larger discharge current density is inevitably concerned with a search for compromise between reduction in a total energy capacity of the electrode and an increase in its porosity and electrical conductance with the electrode volume remaining invariable.

The electrode of an electrochemical cell is usually comprised of a mixed composition consisting of an electrode-active material, a binder, and an electrode conductance increasing material. To establish porous structure in electrodes use is made of pore-formation materials (expanding agents) in the capacity of which such substances and materials are applied that are liable to dissolve or volatile upon physico-chemical treatment of preformed electrodes. As a result, a porous structure is established in the electrode, required for lodging therein electrolyte and depositing solid products of the current-producing reaction (cf. a textbook "Electrochemical cells with lithium electrode" by I. A. Kedrinski et al., Krasnoyarsk University Publishers, Krasnoyarsk, 1983, pp. 248, 144–147 (in Russian) [1].

Known in prior art are a variety of expanding agents such as expanded granulated graphite (expandate) (cf. "Active mass of positive electrode of a primary cells" by Peter Faber. USSR Inventor's Certificate # 488,432, IPC Holm 13/02, 21/00, published on Oct. 15, 1975 in Bulletin # 38 [2]; "Positive electrode of an electrochemical cell" by B. K. Makarenko et al., USSR Inventor's Certificate # 564,668, IPC Holm 4/98, 6/14, published on Jul. 5, 1977 in Bulletin # 25 [3]); some organic substances, e.g., camphor (cf. French Patent # 2,093,287, IPC Holm 13/00, 1972 [4]) or soluble inorganic compounds such as potassium hexafluorophosphate (cf. "Process for producing porous electrode for an electrochemical cell with nonaqueous electrolyte" by N. S. Lidorenko et al., USSR Inventor's Certificate # b 527,775,IPC Holm 4/62, published on Sep. 5, 1976 in Bulletin # 33 [5]). Used for the same purpose are also insoluble inorganic compounds and materials featuring a porous structure per se, i.e., zeolites (cf. "An electric cell with organic electrolyte" by N. Watanabe et al., Japan Patents 61-264,679, 61-264,680, 61-264,682, 61-264,681, IPC Holm 6/16 of May 20, 1985 [6]), or activated alumina(cf. "Element of the lithium—fluorocarbon system" by Suetsugu Satiko, Japan Patent N 63-334,457, IPC Holm 4/06 of Dec. 28, 1988 [7]). All the materials mentioned above when introduced in the composition are liable to improve discharge characteristics; however, this reduces the electrode density, with the result that the capacitance of the electrochemical cell is reduced due to a lower content of the electrode-active material.

Methods for making porous cathodes for electrochemical cells boils down to a combination of sequences of the steps of preparing, mixing, and treating the parent components, a most frequently used practice is to mix all the prepared ingredients in a single step (cf. references 1 to 7), in the presence of water or organic solvents, whereupon the semi-finished items of a cathode material are isolated, dried, and disintegrated. Then the cathodes are formed, provided with current leads (by, e.g., pressing them into cathode casings) are subjected either to washing out the expanding agent with an appropriate solvent or to thermal treatment for removing the sublimating expanding agents from the cathode. As a result, a porous structure necessary for normal operation of an electrochemical cell is established in the cathode (cf. references 2, 4, 5). However, porous cathodes of electrochemical cells, wherein used as expanding agents are such soluble compounds as camphor [4] or potassium hexafluorophosphate [5] are rather hard to be washed out from an expanding agent. This is concerned with the fact that the particles of the spent expanding agent are occluded during the cathode forming process with a binder or an energy carrier, which affects adversely the properties of a cathode and of an electrochemical cell based thereon. For that reason many times repeated procedures are used for completely removing the expanding agent, which involves the use of further amounts of solvents. In addition, use of said materials and methods of making electrodes for electrochemical cells renders impossible realizing higher energy characteristics in a lithium electrochemical cell having a porosity of 35–50% adequate for serviceability of an electrochemical cell, because porous cathodes of electrochemical cells, wherein used as expanding agents is zeolite [6] or activated alumina [7] feature a reduced weight and volume energy capacity, that is, such expanding agents fail to exhibit electrical activity being therefore no more than useless ballast.

Use of a known active cathode mass in electrochemical cell electrodes which contains a metal oxide (such as manganese dioxide, lead monoxide or mixtures thereof) as an electrode-active material, and graphite expandate [2] as an electrical conductance increasing agent, affects adversely the electrode specific energy capacity. Graphite expandate (expanded graphite) serves in cathode material also as an expanding agent due to its low density (0.007–0.05 g/cu.cm), large specific surface [2], and high porosity. Used for making electrode material is a natural graphite expandate of the coral-like structure which makes up to 25% of the weight of energy carrier. The coral-like structure of the graphite expandate is realized in case of a separately conducted thermolysis of various graphite compounds, such as fluorinated graphite [3]. Adding graphite expandate to the electrode composite is an inconvenient procedure due to its material being a badly dusting one.

One prior-art electrochemical cell electrode and a method of making same (EP Patent N 0146764, IPC Holm 4/06, 4/88 [8] are known, the electrode material comprising an electrode-active material in the capacity of which carbon monofluoride is used, a binding agent (fluopolymer), and an agent increasing electrical conductance of the electrode-active material. During the electrode producing process an expanding agent is added, a nonpolymer additive (alcohols, hydrocarbons, solutions) being used as said agent. The expanding agent is introduced into a mixture of ingredients during their intermixing at the very beginning of the electrode producing process so as to prepare a dough-like mass and make a finished resilient microporous carbon-containing electrode therefrom by removing the expanding agent. The porous structure of the cathode is formed after the expanding agent has been evaporation removed, which follows the electrode making process comprising intermixing all the components and applying a high shearing force to the resultant mixture so as to form therein a homogeneous filamentary structure, followed by electrode forming by extruding or calendering, pressing, and stacking the packages till obtaining a finished electrode cathode plate for an electrochemical cell.

The aforedescribed material and method of making an electrode (cathode) therefrom are quite acceptable for use in a lithium electrochemical cell. However, said material and method suffer from the following disadvantages stemming from the specific features of the components used in the electrode and of the method for making an electrochemical cell electrode therefrom:

relatively low energy effectiveness, namely, capacitance of the resultant carbon-containing cathode material which is due to an inadequate amount of one of its principal components, i.e., the electrode-active material in the capacity of which carbon monofluoride is used. In a worldwide practice of producing the cathodes of the "fluorocarbon-lithium" system cell batteries used are as a rule fluorocarbon materials, such as dicarbon monofluoride ($C_2F$) and carbon monofluoride ($CF_{1.0}$) which contain up to 59 wt. % fluorine, for instance, fluorinated petroleum coke having a composition $CF_{0.92-1.0}$. Theoretical capacitance of carbon monofluoride is 861 mAh/g;

carbon monofluoride also has a relatively low bulk density (about 1.0 g/cu.cm) which prevents one to introduce a greater amount of energy carrier into the actual volume of the positive electrode of a lithium electrochemical cell in order to increase the specific volumetric energy capacity thereof;

carbon monofluoride has relatively low operating discharge current density values in standard fluorocarbon cathodes (not over 0.1 mA/sq.cm) and is featured by a badly reduced initial discharge voltage under higher current loads, which is due to deposition of solid lithium fluoride on the cathode surface. This phenomenon occurs due to the fact in an actual electrochemical cell under such increased discharge current conditions the total volume of its pores is inadequate for lodging a required amount of electrolyte for dissolving the resultant diffusion layer of solid lithium fluoride, i.e., the product of reaction between fluorocarbon and lithium. Of importance is also the fact that fluorocarbon cathodes offer high ohmic resistance and hence feature high overvoltage value which reveals itself in that the value of the running discharge voltage under a nominal load of 30 kOhm drops to 2.6–2.7 V during the electrochemical cell operation;

when being discharged, an electrochemical cell with a fluorocarbon electrode is frequently liable to swell. This phenomenon is allowed for in constructing a lithium electrochemical cell by introducing a lower amount of fluorocarbon into the electrode to prevent the cell from swelling;

as a result of intermixing the parent components of the carbon-containing electrode material and the following steps of electrode forming by extruding or calendering, pressing, and stacking the packages till obtaining a finished porous cathode plate for an electrochemical cell, the resultant cathode plate is homogeneous but rigid due to a strong volume cohesion of composite by the binding agent, i.e., fluoropolymer;

when making the electrode using the known method, that is, by mixing all components in a single step and applying a high shearing force to the resultant mixture so as to form therein a homogeneous filamentary structure of the electrode material, the particles of the electrode-active material and those of the agent adding to electrical conductance of said material are excessively occluded with the binder so that the particles of the active mass are frequently found to be coated-with a layer of the binder which results either in a badly reduced capacitance of the electrode under nominal discharge conditions (0.1 mA/sq.cm) or in failure to operate such an electrode at increased discharge current density values in a lithium electrochemical cell, because such a fluorocarbon electrode in combination with lithium has an output voltage below 2 V with a discharge current density of 0.1 mA/sq.cm and over;

it is rather difficult to effect control over pore formation in the cathode by the known method during production of a finished product (electrode) as pores are formed in such an carbon-containing electrode by virtue of fine droplets of an expanding agent, namely a liquid nonpolymer additive (such as alcohols, hydrocarbons, solutions) which is spread over the cathode composite as result of mixing and volume cohesion during calendering at the expense of a binder. The resultant pores get rid of the expanding agent by volatilizing the nonpolymer liquid used;

as a result of the aforesaid process of making the electrode mass of a carbon-containing material, adhesion of the resultant rigid porous cathode plate to the current lead gets rather low (with a untight press-fitting), wheres in case of a more tight press-fitting (under a higher pressure) the cathode porosity is reduced due to forcing the liquid out of the pores. Thus, an intermediate variant is selected by using such pressure values (or press-fitting on an additional current lead welded on to the cathode cover) at which adhesion is retained and an acceptable cathode porosity is attained.

By and large, practical application of the electrochemical cell production process technique according to the known method affects adversely the discharge characteristics of an electrochemical cell during its operation.

DISCLOSURE OF THE INVENTION

It is a principal object of the present invention to provide a carbon-containing material having such components, and such a method of making porous electrodes from said material that are instrumental in attaining higher specific energy characteristics of the carbon-containing material in the electrode of an electrochemical cell, including volume- and weight electrical capacitance and energy capacity, as well as higher operating density of discharge current and voltage, and in simplifying the method of making such electrodes.

The foregoing object is accomplished due to the provision a carbon-containing material for electrodes of electrochemical cells, said material comprising an electrode-active material, a binder, an agent adding to electrical conductance of the electrode-active material, and an expanding agent, wherein, according to the invention, used as the expanding agent is graphite fluoroxide.

A positive effect of applying such an expanding agent resides in that an adequate number of pores for lodging a nonaqueous electrolyte therein are established in the structure of the active mass for making a carbon-containing electrode after the steps of mixing and heat-treatment. In addition, heat-treatment of graphite fluoroxide results in formation of thermally expanded graphite inside the electrode which is in fact an agent increasing electrical conductance of the electrode. Moreover, use of the aforementioned expanding agent makes possible unifying electrode materials by using a single expanding agent for the various types of 1.5- and 3-volt electrochemical cells using different electrode-active materials. Use of such a common expanding agent increases the aforementioned specific energy characteristics of the proposed material in the electrode of an electrochemical cell.

As a rule, graphite fluoroxide is assigned the following general formula:

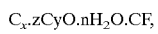
$C_x \cdot zCyO \cdot nH_2O \cdot CF$, where
x=1.5–12,
y=2.2–2.5,
z=0.5–1.4,
n=0.1–0.5 cf. USSR Inventor's Certificate N 955,654 by L. L. Gornostaev et al., registered on May 4, 1982 for "Graphite fluoroxide and process for producing same", IPC C01B 31/00 [9]). However, use of such a product as an expanding agent is efficient only in rather expensive cathode masses based on fluorocarbon as an electrode-active material, whereas it proves to be more expedient that used as an expanding agent in cathode masses based on oxides and sulfides of metals or mixtures thereof is another less expensive type of graphite fluoroxide featuring a modified phase ratio (i.e., an increased content of the graphite phase and reduced content of the graphite fluoroxide phase), expressed by another general formula:

$C_x \cdot zCyO \cdot nH_2O \cdot CF$, where
x=5–15,
y=2.2–2.5,
z=0.2–2.0,
n=0.1–2.0.

This is due to the fact that graphite fluoroxide prepared by known processes appears nearly always as a close mixture of the three phases, wherein present in the graphite phase ($C_x$) are the phases of graphite oxide ($zC_yO$) and fluorinated graphite (CF) which have been etched out during oxidation. Accordingly, chemical behavior of graphite fluoroxide and hence conditions for its use as an expanding agent are dependent on the ratio between and behavior of all the three phases at a variable temperature.

It is most expedient that fluorocarbon containing 58 to 67 wt. % fluorine be used as the electrode-active material of a carbon-containing material with a view to increasing the energy capacity thereof to a maximum possible level, because such a fluorocarbon is superior to the known fluorocarbon materials (namely, carbon monofluoride or fluorinated petroleum coke) as for the amount of fluorine and hence contains more energy, whereby the object of the invention as to increasing specific energy capacity of the electrode and of an electrochemical cell as a whole is accomplished.

It is also expedient, with a view to increasing specific energy capacity of the material and of an electrode based thereon, that used as the electrode-active material be high specific energy capacity compounds of transition metals, such as oxides and sulfides of metals taken either separately or in combination.

It is expedient that with a view to increasing specific energy capacity of three-volt lithium electrochemical cells, used as the electrode-active material be less expensive manganese dioxide.

It is also expedient to use graphite fluoroxide in combination with the electrode-active materials used in one and a half-volt electrochemical cells, namely, copper oxide, as well as a mixture of copper oxide with pyrite or chalcopyrite.

A good effect is attained when using copper oxide, as well as a mixture of copper oxide with pyrite or chalcopyrite in combination with graphite fluoroxide, a binder, and a conductance-increasing agent which increases electrical conductance of the carbon-containing materials for electrodes of one and a half-volt electrochemical cells.

Thus, practical use of the herein-proposed carbon-containing material for electrodes of electrochemical cells makes possible producing porous electrodes for electrochemical cells, which electrodes being superior to known electrodes as to capacitance. This is attained due to forming pores in the structure of an electrode made from the proposed carbon-containing material. Pores in an electrode are necessary for lodging electrolyte therein. In addition, a close mixture of the products of thermolysis of graphite fluoroxide with the electrode-active material makes it possible to attain higher factors of utilization of the electrode-active material as will hereinafter be demonstrated.

The foregoing object is accomplished also due to the provision of a method of making porous electrodes for electrochemical cells, comprising mixing an electrode-active material, a binder, an agent increasing the conductance of the electrode-active material, and an expanding agent, and forming a finished product, wherein, according to the invention, used as the expanding agent is graphite fluoroxide and mixing the components are effected in several steps so that at the first step graphite oxyflouride is mixed with the electrode-active material, then the resultant mixture is modified until an intermediate product is obtained, which is then mixed with the binder and the agent increasing the conductance of the electrode-active material, and formation of a finished product is followed by its heat-treatment till forming pores in the structure of the finished electrode without its destruction.

A step-by-step mixing of components and modification of the resultant mixture at the first step are conducive to a close mixing of the electrode-active material together with the expanding agent which is accompanied by further disintegration of the components and by an increase in the bulk density of the mixture of the electrode-active material with graphite fluoroxide, thus adding to the electrical conductance of the latter. In addition, such step-by-step mixing of the components enables one to control final density and porosity of the electrode material by regulating the mixing conditions at the second step to obtain an elastic active mass. Provision of said elastic resulting from the second step of final mixing of all the components facilitates the electrode forming process and control of its density. A positive effect of such a method of making a porous electrode consists in a possibility of attaining higher energy capacity of the electrode under nominal discharge conditions (0.1 mA/sq.cm) which is due to combining a number of newly arising effects:

lodging in the electrode free space an adequately large amount of any of the aforelisted electrode-active materials modified in a mixture with the expanding agent makes it possible to attain a substantially higher specific energy capacity of such electrodes than that in the best of the heretofore-known 1.5- and 3-volt lithium 17 lithium electrochemical cells;

use of the herein-proposed expanding agent, viz, graphite fluoroxide in the electrode and a method for making said electrode makes possible attaining a higher density of continuous discharge current (0.75–1.0 mA/sq.cm and over) with a high capacitance remaining unaffected, which is attained due to heat-treatment of the finished product, since thermal decomposition of graphite fluoroxide is accompanied by forming pores therefrom in the electrode without destruction of the latter, as well as by forming thermally expanded graphite uniformly distributed in the electrode material, the presence of which adds to the conductance of both said material and said electrode and hence makes it possible to reduce a voltage drop of the current source as a whole due to its internal resistance.

Used as graphite fluoroxide may be any of the known ones, though it is most expedient to use graphite fluoroxide of the following general formula:

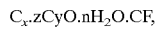

where
x=1.5–15,
y=2.2–2.5,
z=0.5–1.4,
n=0.01–0.5.

It is expedient that used as electrode-active materials for attaining higher specific energy capacity of electrodes and electrochemical cells are substances which feature maximum energy capacity, viz, fluorocarbon and manganese dioxide for making the cathodes of three-voltage lithium electrochemical cells, as well as oxides and sulfides of transition metals, in particular, copper oxide, pyrite, chalcopyrite taken either separately or in combination.

Use of each of the aforementioned electrode-active materials as components of the electrode masses for lithium electrochemical cells in combination with the rest of the components of a carbon-containing material makes it possible to provide electrodes of lithium electrochemical cells having higher specific energy capacity.

It is desirable that the electrode-active material and graphite fluoroxide be mixed together in a weight ratio of from 8:1 to 40:1, respectively which has been found experimentally. The lower limit of said ratio is determined by the fact that when the graphite fluoroxide content of the composition is below 40:1, this renders the effect of adding the expanding agent immaterial and does not virtually increase the energy capacity of an electrochemical cell and the attainable operating density of discharge current. The upper limit of said ratio is determined by the fact that with the graphite fluoroxide content of the composition exceeding 8:1 the resultant electrode though being highly porous, features a reduced content of the electrode-active material, which result in an affected capacitance of a lithium electrochemical cell.

It is favorable that at the second step of mixing a diluent is added to the mixture until a paste-like mass is obtained, whereby a homogeneous elastic paste-like material can be obtained.

It is expedient to use a polytetrafluoroethylene suspension as the binder, whereby an adequately strong elastic homogeneous material can be obtained which can readily be rolled on roll.

Heat-treatment is desirable to perform at 150 to 350° C.

The aforementioned temperature range is characteristic of thermolysis of the graphite fluoroxide having the above-specified composition and is adequate for a uniformly running complete thermolysis of graphite fluoroxide and forming pores in the structure of a carbon-containing electrode without collapsing the shape thereof.

It is expedient that modification be effected by virtue of an impact action, the most efficient being such action with a gravitational acceleration of tumbling bodies ranging from 10 g to 75 g, where g is gravitational acceleration. As a result of such a treatment fluorocarbon materials get modified, that is, the aforedescribed changes occur, in particular, bulk density is increased, concentration of paramagnetic centers rises, and the size of crystallites or particles is reduced which is accompanied with reduced coherent scattering areas. This in turn leads to increased discharge characteristics of fluorocarbon materials and higher energy capacity of cathode materials made therefrom. An averaged interplanar spacing (according to X-ray diffraction findings) is likewise somewhat reduced due to an abruptly diminished quantity of combined-layer structures.

It is desirable that the impact action be carried out in the presence of water or a low-boiling organic solvent taken in an amount of from 0.1 (which is the level of natural moisture-content of an electrode-active material) to 5 wt. % in the mixture. In this case the impact action is favorable to effect before obtaining an intermediate product having a bulk density of from 1.0 to 1.5 g/cu.cm.

Presence of water or a low-boiling organic solvent in mechanical impact treatment of a mixture of fluorocarbon and graphite fluoroxide provides further effect due to the fact that in the presence if 0.1–5 wt. % water or a low-boiling organic solvent the material becomes no longer dusty but retains looseness and a required intermediate product density (1.0–1.5 g/cu.cm) is attained faster than without using a liquid additive.

It is desirable that at the second step of the mixing process the latter is performed in the presence of water, ethanol, a mixture of both, or a low-boiling hydrocarbon having a boiling point below 100° C. This makes possible producing a past-like mass from which electrode bands and finished electrodes are readily shaped and which is easily press onto current leads during the electrode shaping procedure.

Thus, the herein-proposed carbon-containing material for electrodes of electrochemical cells and a method of making porous electrodes therefrom is instrumental in attaining the following advantages in an electrochemical cell, predominantly a lithium one:

higher specific volume and weight energy capacity of a carbon-containing electrode which is attained due to a combination of an increased utilization factor of the electrode-active material with an adequately high content of the latter in the electrode;

higher ultimate operating density of the electrode discharge current in electrochemical cells attainable due to the provision of a porous electrode, as well as due to modifying of a mixture of an electrode-active material and an expanding agent to obtain an intermediate product, followed by making a porous electrode;

provision of a standard production procedure of electrodes featuring in creased energy capacity, using a broad range of electrode-active materials for creating efficient lithium electrochemical cells of both 1.5- and 3-volt systems.

Use of graphite fluoroxide as the expanding agent makes possible applying for making the electrode of a higher energy capacity electrochemical cell a fluorocarbon leaner in fluorine (and hence less expensive), containing as low as 58 wt. % fluorine (which corresponds to $CF_{0.87}$) rather than 61.29 wt. % (as required for carbon monofluoride $CF_{1.0}$) which enables one to extend the range of electrode-active materials used.

BEST METHOD OF CARRYING OUT THE INVENTION

The following starting materials are used for carrying the invention into effect.

Used as electrode-active materials are fluorocarbons with a fluorine content of 58–67 wt. % or compounds of transition metals, such as oxides and sulfides of such metals taken either separately or in combination, e.g., copper oxide, a mixture of copper oxide with pyrite or chalcopyrite.

Use of fluorocarbon materials having a fluorine content below 58 wt. % is of low efficiency, since electrodes and electrochemical cells thus produced possess lower energy capacity than that attained for the heretofore-known "fluorocarbon-lithium" system. Use of fluorocarbon materials having a fluorine content above 67 wt. % which is the case with polytetrafluoroethylene containing 76 wt. % fluorine, as the electrode-active material proves to be inefficient because such fluorine-rich materials are in fact electrochemically inactive. Therefore use is made as a rule of a fluorocarbon having a fluorine content of 65–67 wt. %.

Used as the binder may be a polytetrafluoroethylene suspension.

Used as the expanding agent is graphite fluoroxide having the following general formula:

where
x=1.5–15,
y=2.2–2.5,
z=0.5–1.4,
n=0.1–0.5.

It is basically practicable to use graphite fluoroxides prepared by the heretofore-known processes and featuring another composition; however, said processes are very complicated, whereby such graphite fluoroxides are more expensive and hence less efficient products. Moreover, graphite fluoroxides of other compositions are not considerably superior to that proposed herein as to the energy capacity and discharge current density attainable in the electrode of a electrochemical cell.

A minimum value of x=1.5 in the general formula of ghaphite fluoroxide is dictated by experimental capabilities of producing said material according to the process [8] and also by the fact that with value of x below 1.5 one does not so far succeed in selecting an electrode composition with the use of which the electrode would not be destructed during the heat-treatment procedure due to vigorous thermolysis of such a graphite fluoroxide.

A maximum value of x=15 in the general formula of graphite fluoroxide is selected on account of the fact that its further increase, that is, further increase in the proportion of the graphite phase in the mass of graphite fluoroxide neither results in a considerable pore formation effect nor further increases discharge characteristics of an electrochemical cell electrode.

It is common practice to use a graphite fluoroxide having the value of x=12–15 as the most inexpensive expanding agent.

As a rule, used as the agent increasing the conductance of the electrode-active material (and of the electrode as a whole) is acetylene black.

Usually there is taken 78–85 wt. % of an electrode-active material, e.g., fluorocarbon material having a fluorine content of 58–67 wt. % and a natural moisture content of from 0.1 to 1.0 wt. %, whereupon said material is mixed directly in the drum of a mechano-chemical activator (cf., e.g., Centrifugal barrel mill, USSR Inventor's Certificate N 101, 874, Bulletin N 11, 1955) [11] with graphite fluoroxide of the following general formula:

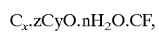

where
x=1.5–15,
y=2.2–2.5,
z=0.5–1.4,
n=0.1–0.5, with their weight ratio of from 8:1 to 40:1, whereupon water or a low-boiling solvent (ethanol, acetone, volatile hydrocarbon) is added to the resultant mixture in an amount of 1.0–5.0 wt. %, and the mixture is modified, at the first step of mixing, by subjecting it to mechanical impact treatment until an intermediate product is obtained, having a bulk density of from 1.0 to 1.5 g/cu.cm, said treatment being carried out in, e.g., a planetary-friction apparatus at a gravitational acceleration of 10–75 g, the treatment time being usually 2.5 min. A minimum gravitational acceleration 10 g (where g stands for free fall acceleration) is obtained experimentally as a result of checking for absence of a substantial impact action on the fluorocarbon material in various treatment apparatus (in particular, effects described in Example 2 hereinbelow occur at a gravitational acceleration of 10 g after a prolonged impact action and at a higher power consumption and a longer treatment time, accordingly). A maximum value of gravitational acceleration used is 75 g. When said acceleration value exceeds 75 g this leads to badly increased power consumption and to higher construction requirements imposed on the components of treatment apparatus, especially as to wear-resistance thereof (it is not permissible to allow considerable amounts of metal resulting from attrition of rubbing surfaces to get in cathode masses) without further substantial modification of the properties of the fluorocarbon materials involved.

Routine mechanical treatment, viz, extensively known disintegration of material in traditional disintegrators or grinders (with an acceleration of grinding or tumbling bodies of from 1 to 5 g in, e.g., ball mills or disk-type grinders) fails to provide an increased number of paramagnetic centers and to change other important properties of an electrode-active material. It is practicable, however, to use other modification methods by virtue of mechanical action exerted by other apparatus capable of providing impact conditions, i.e., from 10 to 75 g. It is also practicable to use chemical methods for modifying the surface of an electrode-active material, e.g., by treating fluorocarbon materials in a controlled gaseous medium at an elevated temperature (over 350° C.). However, application of such methods to a mixture of graphite fluoroxide with an electrode-active material might provoke a premature "swelling" of the intermediate product due to graphite fluoroxide thermolysis, thus rendering it unfit for further making carbon-containing porous electrodes for higher energy capacity electrochemical cells.

It is found experimentally that the best density of the resultant intermediate product (viz, a modified mixture of graphite fluoroxide with a fluorocarbon material) lies within 1.0 and 1.5 g/cu.cm. With lower density values of the intermediate product the resultant finished electrode though being of high porosity but has a lower volumetric energy capacity than is required for electrochemical cells. Though higher density values are basically attainable in the course of the modification process, it is, however, difficult to produce from the obtained intermediate product an elastic paste-like material necessary for a successful electrode shaping procedure. Furthermore, attempts to attain higher intermediate product density lead to badly increased consumption of the material the tumbling bodies are made from, with the resultant contamination of the electrode with foreign impurities and adversely affected the durability of the electrode properties and the service life of an electrochemical cell proper.

The post-modification intermediate product consisting of a close mixture of graphite fluoroxide with an electrode-active material, at the second step is mixed n a separate container with a binder (usually a polytetrafluoroethylene suspension) and with an agent increasing conductance of the electrode-active material (usually acetylene black). The binder is usually added in an amount of 5–10 wt. % and the amount of the agent increasing conductance of the electrode-active material and of the carbon-containing electrode in electrochemical cells equals usually 5–10 wt. % of a total weight of the material. Mixing is effected in, e.g., a standard propeller (or another-type) stirrer until a homogeneous mass of the carbon-containing material for electrochemical cell electrodes is obtained.

The mixture obtained at the second step may be doped with two- or five-fold amount of water, ethanol or a volatile hydrocarbon (such as hexane, heptane, gasoline) for a better mixing procedure, which is carried out in, e.g., a standard propeller stirrer until a paste-like mass is obtained. Once the paste-like mass has been separated, the carbon-containing material for electrochemical cell electrodes is dried at, e.g., 100–150° C. for a main proportion of moisture or diluent to eliminate.

The resultant carbon-containing material for electrochemical cell electrodes is wetted with ethanol or heptane using, e.g., a standard technique disclosed in [1] and the resultant paste-like electrode mass is rolled on rolls to obtain a blank of the electrode band. Then carbon-containing electrodes are cut out of said band and pressed onto electrical leads, e.g., metal cases of disk-type electrochemical cells or metal screens of roll-type electrochemical cells, or else they are pressed into, e.g., metal cylindrical jars of packed-type chemical cells, which jars also serve as electrical leads. The electrode blanks together with electrical leads are subjected heat-treatment in, e.g., a vacuum drying cabinet at 150–350° C. The drying conditions (i.e., rate of temperature elevation and a drying cabinet holding time) should be so selected as to prevent destruction of finished electrodes but to provide elimination of volatile products (water, organic solvents, and products of thermolysis of graphite fluoroxide) resulting in pore formation inside the electrode structure. Finally, electrochemical cells, e.g., lithium cells of the disk or cylindrical construction are assembled.

For a better understanding of the invention given below are some specific exemplary embodiments thereof.

EXAMPLE 1

Porous electrodes having specific preset parameters were made, using the abovedescribed technique, whereupon disk-type lithium electrochemical cells were assembled from said electrodes with use of standard electrolyte grade 1M $LiClO_4$ in a mixture with propylene carbonate and dimethoxyethane. The assembled cells were of the following standard size: BR2325 (the "fluorocarbon-lithium electrochemical system) and CR2325 (the manganese dioxide-lithium electrochemical system). The discharge tests of the cells were conducted at room temperature under a 30 kOhm load. The test results are tabulated in Table 1 below.

TABLE 1

| | NN nn 1 | Electrode-active material 2 | Fluorocarbon material 3 | Manganese dioxide 4 |
|---|---|---|---|---|
| Specific electrode capacitance, mah/g | 515 | 590 | 630 | 320 |
| Fluorocarbon fluorine content, wt. % | 58.0 | 63.0 | 67.0 | — |
| Electrode-active material content of mixture in wt. % with respect to electrode weight | 85.0 | 82.0 | 78.0 | 80.0 |
| Binder content, wt. % | 5.0 | 5.0 | 5.0 | 7.0 |
| Value of "x" in graphite fluoroxide formula | 1.5 | 12.0 | 15.0 | 15.0 |
| Weight ratio of graphite fluoroxide to electroactive material | 1:8 | 1:12 | 1:20 | 1:40 |
| Intermediate product density, g/cu · cm | 1.2 | 1.5 | 1.3 | — |
| Acceleration of tubling bodies, "g" units | 45 | 10 | 75 | — |
| Content of water or low-boiling organic solvent during modification, wt. % | 0.1 | 1.0 | 5.0 | — |
| Heat-treatment temperature, ° C. | 250 | 270 | 350 | 150 |

In what follows are further exemplary embodiments of the present invention making use of various materials for making porous electrodes for lithium electrochemical cells.

EXAMPLE 2

Fluorocarbon materials appearing as powders containing 63–67 wt. % fluorine, as well as disintegrated fluorinated fabric containing 58–61 wt. % fluorine and appearing as pieces of fluorinated fabric and dust resulting from cutting said fabric into pieces, were mechanically treated in standard ball mills for 8–20 hours at a rotation speed of 2 to 20 rpm, the acceleration of a free falling tumbling body, i.e., a ball being virtually equal to gravitational acceleration (g). After such a treatment the bulk density of the resultant disintegrated fluorocarbon materials increases but insignificantly compared with the initial one, namely, by 3–7 wt. % for the material containing 65–67 wt. % fluorine, by 10–15 wt. % for the material containing 63–65 wt. % fluorine, and by 10–15% for the disintegrated fluorinated fabric. Concentration of paramagnetic centers for all types of fluorocarbons remains virtually unaffected (within the sensitivity of the electronic paramagnetic-resonance method). The size of the coherent scattering areas (that is, the size of microparticles of fluorocarbon materials) within the accuracy tolerance of the X-ray diffraction method remains likewise invariable. It is particle size distribution alone (determined by means of sieve analysis) that is found to have changed; in particular, for the two former of abovedescribed materials an average size of macroparticles (aggregates of microparticles) decreases two- or fourfold. The fluorine content (within accuracy tolerance of the analysis) of the disintegrated fluorocarbon materials remains the same as in the starting materials.

Carbon-containing electrodes made from disintegrated fluorocarbon materials by a standard procedure of mixing them with acetylene black and a binder, viz, polytetrafluoroethylene suspension taken according to same formulation (i.e., 80 wt. % powdered fluorocarbon, 10 wt. % acetylene black, and 10 wt. % polytetrafluoroethylene suspension), and preparing according to the flowsheet of the known method (except for using a strong shearing force) were tested on stacks of BR2325 type lithium electrochemical cells. The following findings were obtained as to the capacitance of lithium electrochemical cells with a discharge current density of 0.1 mA/sq.cm: for the first material, 190+13 mAh, for the second material, 160+15 mAh, and for the powdered fluorocarbon prepared from disintegrated fluorinated fabric, 140+20 mAh. With a discharge current density of 1.0 mA/sq.cm the results of capacitance measurement were by approximately 20–6-% lower, while the worst results were exhibited by electrochemical cells based on the second and third materials.

The minimum number of the electrochemical cells produced and of electrical measurements conducted in each series for each material is 10.

For the sake of comparison there were tested electrochemical cells made on the base of fluorocarbon cathodes of the same composition made from nondisintegrated first and second materials. The test findings as to capacitance after mechanical impact treatment are tabulated in Table 2 below.

TABLE 2

Results of impact treatment of various fluorocarbon materials

Treatment conditions: gravitational acceleration, 10–75g, treatment time, 3–5 min

| Characteristic | Starting material | Treated material |
|---|---|---|
| 1 | 2 | 3 |
| Powdered fluorocarbon with 65–67 wt. % fluorine content | | |
| Bulk density, g/cu · cm | 0.85 + 0.05 | 1.3 + 0.10 |
| Size of coherent scattering area, A | 22.5 + 1.5 | 16.5 + 2.5 |
| Average size on "C", A | 6.64 + 0.02 | 6.61 + 0.01 |
| Weight concentration of paramagnetic centers, g$^{-3}$ | 16 * 1018 | 28 * 1018 |
| Volume concentration of paramagnetic centers, cm$^{-3}$ | 13 * 1018 | 39 * 1018 |
| Capacitance of disk-type lithium electrochemical cell, mAh | 190 + 13 | 225 + 12 |
| Powdered fluorocarbon with 63–65 wt.% fluorine content | | |
| Bulk density, g/cu · cm | 0.45 + 0.15 | 1.3 + 0.10 |
| Size of coherent scattering area, A | 22.5 + 1.0 | 17.0 + 1.5 |
| Average size on "C" axis, A | 7.64 + 0.02 | 6.71 + 0.02 |
| Weight concentration of paramagnetic centers, g$^{-1}$ | 4.5 * 1018 | 6.4 * 1018 |
| Volume concentration of paramagnetic centers, cm$^{-3}$ | 1.6 * 1018 | 8.3 * 1018 |
| Capacitance of disk-type lithium electrochemical cell, mAh | 165 + 25 | 205 + 10 |
| 1 | 6 | 7 |
| Powdered fluorocarbon with 65–67 wt. % fluorine content obtained from fluorinated fabric | | |
| Bulk density, g/cu · cm | 0.80 + 0.20 | 1.2 + 0.15 |
| Size of coherent scattering area, A | 35–50 | 19.5 + 0.5 |
| Average size on "C" axis, A | 7.44 + 0.20 | 6.67 + 0.05 |
| Weight concentration of paramagnetic centers, g$^{-1}$ | 4.5 * 1018 | 6.4 * 1018 |
| Volume concentration of paramagnetic centers, cm$^{-3}$ | 1 * 1018 | 29 * 1018 |
| Capacitance of disk-type lithium electrochemical cell, mAh | 150 + 25 | 180 + 10 | cell capacitance with discharge current density of 0.1 mA/sq.cm: for powdered fluorocarbon materials, 165+35 mAh; for powdered fluorocarbon materials from fluorinated fabric, 150+35 mAh.

It follows from the Examples adduced hereinbefore that as far as powdered fluorocarbon materials are concerned, standard disintegration in ball mills does not virtually increase maximum capacitance of a lithium electrochemical cell but tells only on the root mean square (standard) deviation with a general average capacitance decrease in a series. Thus, the role played by mechanical treatment of the fluorocarbon material in a ball mill boils down solely to producing finely ground powders without any noticeable change in their properties.

Industrial applicability of the present invention is supported by the following examples.

EXAMPLE 3

Fluorocarbon materials appearing as powders or pieces ((fibres)) of fluorinated fabric containing 0.1 wt. % water (which is a natural moisture content of the materials) were charged in the drums of a planetary-friction disintegration apparatus of any type (use was made of APF-3, APF-7, and APF-8 units, as well as some other laboratory apparatus capable of developing a tumbling body acceleration of 10–75 g), wherein they were treated using the method of mechanical impact action by virtue of, e.g., special grinding bodies (balls) for 3–5 min. The data on the changes occurred in the thus-treated fluorocarbon materials are tabulated in Table 2.

It follows from the data of Table 2 that mechanical impact treatment is capable of changing in the properties of fluorocarbon materials telling positively on accomplishing the object of the invention, i.e., provision of higher energy capacity of electrochemical cells.

Note: It is the abovedescribed mechanical impact treatment of fluorocarbon materials that increases the values of the open-circuit voltage in lithium electrochemical cells by 0.15–0.2 V on the average, as well as the maximum attainable values of discharge current density (approximately three- or fivefold and up to 5 mA/sq.cm) which gives evidence of a reduced overvoltage in a fluorocarbon-lithium electrochemical cell. The said increase in the specific energy capacity of the electrode of a lithium electrochemical cell makes possible using even a fluorocarbon having a relatively low fluorine content, that is, a powdered material resulting from mechanical impact treatment of fluorocarbon fabric, containing as low as 58 wt. % fluorine, that is, less than the fluorine content of carbon monofluoride in the known method.

EXAMPLE 4

There was carried out a mechanical impact treatment of fluorocarbon materials having a fluorine content of 58–67 wt. % in the presence of 1 wt. % water (an increased moisture content of the materials which had been developed during storage in a humid atmosphere) for 2–3 min. The resultant modified fluorocarbon materials had the same characteristics which are specified in Table 2 with reference to the materials having a moisture content of 0.1 wt. %. Similar results as to the characteristics of the fluorocarbon materials under treatment were obtained therefor when they were wetted to a moisture content of 1–5 wt. % organic solvents applied in the cathode mass production techniques, viz, ethanol, acetone, and liquid hydrocarbons (hexane, heptane,. and decane). However, as a result the required treatment time was decreased to 1–2 min, whereby the material became low-dusting.

Note: The method described in the above Example is especially suitable and convenient for handling such a "dusty" fluorocarbon material (having a relatively low bulk density) as fluorinated black having a fluorine content of 63–65 wt. %.

EXAMPLE 5

A number of test series of fluorocarbon-based cathode materials were made using the abovedescribed methods, said materials having the following composition: 78–85 wt. % of the fluorocarbon material of the three types stated in Example 2, 5–10 wt. % of a binder, 3–10 wt. % of graphite fluoroxide of the following general formula:

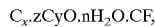

$C_x \cdot zCyO \cdot nH_2O \cdot CF$, where x=1.5–15, y=2.2–2.5, z=0.5–1.4, n=0.1–0.5, as well as 5–15 wt. % of acetylene black. As a rule, use is made of mean values of the above specified ranges of electrode components. Then positive electrodes (cathodes) were made (shaped) from said cathode masses, and type BR2325 fluorocarbon-lithium electrochemical cells were assembled, using standard grade 1M LiClO$_4$ electrolyte in a mixture with propylene carbonate and dimethoxyethane. Thereupon said cells were subjected to discharge testing at room temperature under a 30 kOm load. The test findings with reference to characteristics and composition of the cathodes are tabulated in Table 3 below. The lower and upper limits of content of the binder and of the agent increasing the conductance of the electrode-active material and that of the electrode as a whole are specified in the first two and the last four lines of Table 3 for a powdered fluorocarbon material having a fluorine content of 65–67 wt. %. For the sake of comparison the Table contains data on the type BR2325 electrochemical cell available from Matsushita Electric (cf. the textbook "Novelties in technology of fluorine compounds", ed. by N. Ishikawa, Moscow, Mir Publishers, 1984, pp. 149, 592 (in Russian).

TABLE 3

Attainable performance parameter of cathode material

| Acceleration of tumbling bodies, g | Capacitance of type BR2325, electrochemical cell, mAh | Average discharge voltage, V | Average discharge current, mA/sq · cm |
|---|---|---|---|
| For powdered fluorocarbon material with a fluorine content of 65–67 wt. % there is indicated a maximum parameter attained upon heating the finished electrode to 270° C. | | | |
| 75 | 205 | 2.58 | 0.20 |
| For powdered fluorocarbon matarial with a fluorine content of 65–67 wt. % heat-treatment is performed at 180-270° C. except for line 8 where heat-treatment temperature is 350° C. | | | |
| 10 | 10 | 2.64 | 0.35 |
| 45 | 209 | 2.68 | 0.50 |
| 45 | 222 | 2.68 | 0.60 |
| 75 | 224 | 2.70 | 0.75 |
| 75 | 216 | 2.73 | 0.75 |
| 45 | 201 | 2.70 | 0.75 |
| 45 | 177 | 2.68 | 0.60 |
| 10 | 184 | 2.70 | 0.75 |
| 10 | 185 | 2.73 | 0.75 |
| 10 | 172 | 2.70 | 0.75 |
| 10 | 181 | 2.50 | 0.05 |
| Electrochemical cell, type BR2325 makes use of fluorocarbon available from Matsushita Electric, Japan | | | |
| — | 160 | 2.60 | 0.04 |
| Fluorocarbon with fluorine content of 58–61 wt. % in type BR2325 electrochemical cell (nominal parameter) | | | |
| 75 | 165 | 2.58 | 0.20 |
| Manganese dioxide in type CR 2325 electrochemical cell is available from the Applicant | | | |
| 45 | 130 | from 3 to 2 V | 0.4 |

| Specific energy capacity | | |
|---|---|---|
| mAh/g | Wh/cu · cm | Utilization factor |
| For powdered fluorocarbon material with a fluorine content of 65–67 wt. % there is indicated a maximum parameter attained upon heating the finished electrode to 270° C. | | |
| 506 | 2193 | 78 |
| For powdered fluorocarbon material with a fluorine content of 65–67 wt. % heat-treatment is performed at 180–270° C., except for line 8 where heat-treatment temperature is 350° C. | | |
| 624 | 2488 | 83 |
| 577 | 2320 | 81 |
| 613 | 2399 | 87 |
| 607 | 2393 | 92 |
| 631 | 2446 | 94 |
| 588 | 2191 | 83 |
| 570 | 1955 | 78 |
| 615 | 2059 | 91 |
| 626 | 2085 | 82 |
| 620 | 1875 | 96 |
| 589 | 1650 | 86 |
| Electrochemical cell, type BR2325 makes use of fluorocarbon available from Matsushita Electric, Japan | | |
| 500 | about 1560 | |
| Fluorocarbon with fluorine content of 58–61 wt. % in type BR2325 electrochemical cell (nominal parameter) | | |
| 510 (78) | 1815 | |

TABLE 3-continued

Attainable performance parameter of cathode material

Manganese dioxide in type CR2325 electrochemical, cell is
available from the Applicant
| 262 | about 525 |

Note:
The value of specific weight capacitance in mAh/g is followed by the parenthesized value of utilization factor (in percent) of fluorocarbons in various cathode materials. Characteristics of cathodes based of manganese dioxide are present for comparison.

The results of electrical tests of carbon-containing electrodes used in type BR 2325 electrochemical cell (carried out under the following conditions: 10 kOm load, room temperature, electrostatic discharge, end-point voltage, 2.0 V) are summarized in Table 4 below.

TABLE 4

| NN nn 1 | Cathode mass 2 | Short-circuit current, mA 3 | Initial height of electrochemical cell 4 |
|---|---|---|---|
| 1. | Electrode | 91 | 2.48 |
| 2. | material | 234 | 2.44 |
| 3. | free | 95 | 2.45 |
| 4. | from graphite | 185 | 2.44 |
| 5. | fluoroxide | 83 | 2.44 |
| 6. |  | 67 | 2.75 |
| 7. |  | 66 | 2.44 |
| 8. |  | 58 | 2.44 |
| Average values |  | 110 + 69 | 2.479 + 0.096 |

| 1 | 2 | 3 | 4 |
|---|---|---|---|
| 1. | Electrode | 28 | 2.47 |
| 2. | material | 20 | 2.45 |
| 3. | doped with | 16 | 2.52 |
| 4. | graphite | 18 | 2.64 |
| 5. | fluoroxide | 19 | 2.45 |
| 6. |  | 13 | 2.68 |
| 7. |  | 13 | 2.47 |
| 8. |  | 15 | 2.44 |
| 9. |  | 12 | 2.47 |
| 10. |  | 17 | 2.55 |
| Average values |  | 14.4 + 4.9 | 2.514 + 0.085 |

| Nos. 1 | Final height of electrochemical cell 5 | Average discharge voltage 6 | Capacitance, mAh 7 |
|---|---|---|---|
| 1. | 2.48 | 2.55 | 212 |
| 2. | 2.39 | 2.57 | 243 |
| 3. | 2.65 | 2.53 | 183 |
| 4. | 2.46 | 2.49 | 208 |
| 5. | 2.46 | 2.56 | 202 |
| 6. | 2.63 | 2.54 | 197 |
| 7. | 2.46 | 2.54 | 201 |
| 8. | 2.48 | 2.50 | 198 |
| Average values | 2.503 + 0.087 | 2.54 + 0.03 | 208 + 8 |
|  |  | Utilization factor = | 83.12 + 3.32 |
| 1. | 2.49 | 2.58 | 227 |
| 2. | 2.42 | 2.60 | 229 |
| 3. | 2.54 | 2.55 | 244 |
| 4. | 2.51 | 2.59 | 205 |
| 5. | 2.44 | 2.57 | 238 |
| 6. | 2.43 | 2.58 | 232 |
| 7. | 2.45 | 2.60 | 229 |
| 8. | 2.45 | 2.57 | 208 |
| 9. | 2.46 | 2.57 | 208 |
| 10. | 2.52 | 2.53 | 222 |
| Average values | 2.471 + 0.041 | 2.57 + 0.02 | 227 + 12 |
|  |  | Utilization factor = | 93.63 + 4.95 |

EXAMPLE 6

An electrochemical cell of the "manganese dioxide-lithium" system.

There were prepared cathode masses comprising 80 wt. % manganese dioxide, 5–7 wt. % polytetrafluoroethylene suspension, 3–5 wt. % acetylene black, as well as 2, 5, and 10 wt. % graphite fluoroxide of the following general formula:

$$C_x \cdot zCyO \cdot nH_2O \cdot CF,$$

where
x=1.5–15,
y=2.2–2.5,
z=0.2–2.0,
n=0.1–2.0.

Then positive electrodes (cathodes) were made from said cathode masses, and disc-type lithium electrochemical cells of the CR2325 standard size were assembled using said cathodes, according to a known technique. For the sake of comparing cell properties, lithium electrochemical cells of the CR2325 standard size were made, each of the positive electrodes thereof weighing 0.9 g and comprising 80 wt. % manganese dioxide, 10 wt. % polytetrafluoroethylene suspension, and 10 wt. % acetylene black. The same electrolyte was used in both cell series, viz, 1M lithium perchlorate solution in a mixture of propylene carbonate and dimethoxyethane. The cells thus produced were subjected to discharge testing against loading resistors of 5, 6, and 10 kOhm at room temperature. It had been found as a result of the tests conducted that the following electrical parameters of the CR2325 standard size electrochemical cells were attained in both cell series:

|  | Cells free from graphite fluoroxide | | Cells with graphite fluoroxide | |
|---|---|---|---|---|
|  | R = 5.6 kOhm | R = 10 kOhm | R = 5.6 kOhm | R = 10 kOhm |
| Average discharge voltage, V | 2.55 | 2.70 | 2.60–2.65 | 2.75–2.80 |
| Average discharge capacity, mAh | 115–120 | 125–135 | 145–160 | 165–185 |

EXAMPLE 7

Electrochemical cell of the "copper oxide+pyrite–lithium" and "copper oxide+chalcopyrite–lithium" systems.

There were prepared cathode masses comprising 80 wt. % of a mixture of the compounds of transition metals, comprising 60 wt. % copper oxide and 40 wt. % pyrite, 5–7 wt. % polytetrafluoroethylene suspension, 3–5 wt. % acetylene black, and 2, 5, 10 wt. % graphite oxyflouride of the following general formula:

$$C_x \cdot zCyO \cdot nH_2O \cdot CF,$$

where
x=1.5–15,
y=2.2–2.5,
z=0.5–1.4,
n=0.1–0.5.

Then roll-type positive electrodes (cathodes) were made from said cathode masses, and roll-type lithium electrochemical cells of the CR2325 standard size were assembled using said cathodes, according to a known technique. For the sake of comparing cell properties, roll-type lithium electrochemical cells of the GR6R standard size were made, each of the positive electrodes thereof weighing 0.9 g and comprising 80 wt. % of a mixture of the compounds of transition metals containing 60 wt. % copper oxide and 40 wt. % pyrite, 10 wt. % polytetrafluoroethylene suspension, 20 wt. % acetylene black (free from an expanding agent).

The same electrolyte was used in both cell series, viz, 1M lithium perchlorate solution in a mixture of propylene carbonate and dimethoxyethane.

Then discharge characteristics of 1.5-volt roll-type lithium electrochemical cells of the GR6R standard size were tested for the following two electrochemical systems:

$$Li\text{-}FeS_2+CuO(OM\text{-}P) \text{ and } Li\text{-}CuO+CuFeS_2(OM\text{-}PCHP)$$

There were tested in cathode with a mixture of chalcopyrite and pyrite a total of five positive electrodes prepared by various techniques (said electrodes comprising graphite fluoroxide additives are indicated with the latter "M" in Table 5 below).

Then a comparative discharge testing of various electrodes of pilot-series electrochemical cells of the GR6S standard size was conducted under continuous test conditions and various current loads, using 1M solution of LiClO$_4$ in a mixture of propylene carbonate and dimethoxyethane as electrolyte. Discharges were carried out at room temperature using an automatic test bench until an end-point voltage of 0.9 V is obtained. Averaged randomly selected data of a preliminary testing of pilot-series lithium electrochemical cells of the GR6S standard size are summarized in Table 5 below.

TABLE 5

| Nos 1 | Cathode material 2 | Discharge voltage, V 3 | Operating current, mA 4 | Average operating voltage, V 5 |
|---|---|---|---|---|
| 1 | OM—CHP-m | 2.4–2.9 | 5–20 | 1.30 |
| 2 | OM—CHP | 2.2–2.7 | 5–20 | 1.22 |
| 3 | OM—CHP-m | 2.0–2.4 | 20–60 | 1.33 |
| 4 | OM—CHP | 2.5–2.9 | 20–60 | 1.27 |
| 5 | OM—P-m | 2.9–3.1 | 80–100 | 1.40 |
| 6 | OM—P | 3.0–3.1 | 10–40 | 1.37 |

| Nos 1 | Output capacity, Ah 6 | Utilization factor, % 7 | Internal resistance, Ohm 8 | Internal resistance, Ohm 9 |
|---|---|---|---|---|
| 1 | 2.2–2.50 | 86–99 | 2.2–2.50 | — |
| 2 | 2.1–2.26 | 77–89 | 2.1–2.26 | — |
| 3 | 2.7–2.98 | 73–75 | 1.7–2.47 | 2.1–3.6 |
| 4 | 1.9–2.20 | 78–84 | 0.9–1.75 | 1.9–3.5 |

TABLE 5-continued

| 5 | 3.5–3.64 | 82–86 | 2.1–2.41 | 1.6–2.4 |
| 6 | 2.2–2.35 | 76–82 | 1.5–2.10 | 4.0–5.8 |

According to the performance characteristics attained in the pilot-series electrochemical cells of the GR6P standard size, the highest discharge characteristics are exhibited by the positive electrodes prepared with the use of graphite oxyfluoride.

Thus, practical application of the herein-proposed carbon-containing cathode material and the method of making a porous electrode for electrochemical cells is instrumental in increasing volume- and weight energy capacity of electrode-active additives and hence discharge and capacitance characteristics of the electrodes of lithium electrochemical cells of the various electrochemical systems.

What is claimed is:

1. A carbon-containing material as a precursor for a porous electrode of a chemical source of electric current, comprising:
    an electrode-active material;
    a binder;
    a material adding to electrical conductance of the electrode-active material; and
    graphite fluoroxide as a pore-formation material.

2. The carbon-containing material as a precursor for a porous electrode of a chemical source of electric current as claimed in claim 1, wherein said graphite fluoroxide is expressed by the following general formula:

$$C_x \cdot zC_yO \cdot nH_2O \cdot CF,$$

where
x=1.5–15,
y=2.2–2.5,
z=0.5–1.4,
n=0.01–0.5.

3. The carbon-containing material as a precursor for a porous electrode of a chemical source of electric current as claimed in claim 1, wherein:
    a fluorocarbon is said electrode-active material; and
    said fluorocarbon contains 58 to 67 wt. % fluorine.

4. The carbon-containing material of claim 1, comprising:
    said electrode-active material selected from the group consisting of compounds of transition metals or mixtures thereof.

5. The carbon-containing material of claim 4, wherein:
    said compound of a transition metal is maganese dioxide.

6. The carbon-containing material of claim 4 wherein:
    said compounds of a transition metal is copper oxide.

7. The carbon-containing material of claim 4, wherein:
    said compounds of transition metals are selected from the group consisting of pyrite and chalcopyrite.

8. The carbon-containing material of claim 4, wherein:
    said mixtures of said compounds of transition metals are selected from the group consisting of copper oxide, pyrite and mixtures thereof.

9. The carbon-containing material of claim 4, wherein:
    said mixtures of said compounds of transition metals selected from the group consisting of copper oxides, chalcopyrite and mixtures thereof.

10. A method of making a porous electrode for a lithium chemical source of electric current, comprising the following steps:

selecting graphite fluoroxide as a pore-formation material;

mixing together said graphite fluoroxide and an electrode-active material;

mechanically densifying the resultant mixture of said graphite fluoroxide and said electrode-active material until an intermediate product is obtained;

mixing said intermediate product with a binder and a material which enhances the electrical conductance of the electrode-active material;

molding a blank of said electrode to form an electrode precursor; and heat-treating said precursor of said electrode until pores are formed in the structure thereof.

11. The method of claim 10, wherein
said electrode-active material and said graphite fluoroxide are subjected to said mixing in a weight ratio falling within 8:1 and 40:1, respectively.

12. The method of claim 11, wherein:
during said mixing of said intermediate product with said binder and said material which enhances the electrical conductance of said electrode-active material, a diluent is added to the resultant mixture until a pasty mass is obtained.

13. The method of claim 10, wherein:
said graphite fluoroxide is a graphite fluoroxide has the following general formula:

where
x=1.5–15,
y=2.2–2.5,
z=0.5–1.4,
n=0.01–0.5.

14. The method of claim 10, wherein:
said electrode-active material is fluorocarbon containing from 58 to 67 wt. % fluorine.

15. The method of claim 10, wherein:
said electrode-active material is selected from the group consisting of compounds of transition metals or mixtures thereof.

16. The method of claim 10, wherein:
said electrode-active material is manganese dioxide.

17. The method of claim 10, wherein:
said electrode-active material is copper oxide.

18. The method of claim 10, wherein:
said electrode-active material is selected from the group consisting of pyrite and chalcopyrite.

19. The method of claim 10, wherein:
said electrode-active material selected from the group consisting of of copper oxide, pyrite and mixtures thereof.

20. The method of claim 10, wherein:
said electrode-active material is selected from the group consisting of a mixture of copper oxide, chalcopyrite and mixtures thereof.

21. The method of claim 10, wherein:
said binder is a polytetrafluoroethylene suspension.

22. The method of claim 10, wherein:
said heat-treatment is performed at 150–350° C.

23. The method of claim 10, wherein:
said mechanical densification of said mixture resulting from said mixing of said graphite fluoroxide and said electrode-active material is effected by use of an impact action produced on said mixture by tumbling bodies.

24. The method of claim 23, wherein:
said impact action is carried out by said tumbling bodies at an acceleration applied to said bodies from 10 to 75 g, where g is gravitational acceleration.

25. The method of claim 23, wherein:
said impact action is carried out in the presence of a liquid selected from the group consisting of water and a low-boiling organic solvent; and
an amount of said liquid is within 0.1 and 5 wt. % of the weight of said mixture being subjected to said modification.

26. The method according to claim 10, wherein:
said mixing of said intermediate product with said binder and said material which enhances the electrical conductance of the electrode-active material is carried out in the presence of a liquid having a boiling point not above 100° C. and selected from the group consisting of water, ethanol, and mixtures of thereof with low-boiling hydrocarbon solvents.

27. A porous electrode of a chemical source of electric current, characterized in that it is made from a precursor material comprising:

an electrode-active material;

a binder;

a material which enhances the electrical conductance of the electrode-active material;

graphite fluoroxide as a pore-formation material.

* * * * *